(12) United States Patent
Barth et al.

(10) Patent No.: US 7,201,017 B2
(45) Date of Patent: Apr. 10, 2007

(54) REFRIGERATION UNIT

(75) Inventors: Ulrich Barth, Johannesberg (DE); Dietrich Schneider, Stuttgart (DE); Emanuele Negro, Aix en Provence (FR); Helner Veelken, Aachen (DE)

(73) Assignee: Schneider und Partner Ingenieurgesellschaft, Leinfelden-Echterdingen (DE)

( * ) Notice: Subject to any disclaimer, the term of this patent is extended or adjusted under 35 U.S.C. 154(b) by 0 days.

(21) Appl. No.: 10/297,462

(22) PCT Filed: Jun. 6, 2001

(86) PCT No.: PCT/EP01/06412

§ 371 (c)(1),
(2), (4) Date: Sep. 7, 2004

(87) PCT Pub. No.: WO01/94862

PCT Pub. Date: Dec. 13, 2001

(65) Prior Publication Data

US 2005/0050913 A1    Mar. 10, 2005

(30) Foreign Application Priority Data

Jun. 8, 2000    (DE) .............................. 100 28 543

(51) Int. Cl.
*F25B 15/00*    (2006.01)

(52) U.S. Cl. ........................................... 62/476

(58) Field of Classification Search ................ 62/476, 62/235.1
See application file for complete search history.

(56) References Cited

U.S. PATENT DOCUMENTS

| 2,030,350 | A |   | 2/1936 | Bremser |
|-----------|---|---|--------|---------|
| 2,048,355 | A |   | 7/1936 | Särnmark |
| 3,166,914 | A |   | 1/1965 | Hallatt |
| 5,325,684 | A | * | 7/1994 | Stierlin et al. ................. 62/487 |

FOREIGN PATENT DOCUMENTS

| CH | 650 855 A5 | 8/1982 |
| DE | 487 180 | 12/1929 |
| DE | 936 931 | 12/1955 |
| DE | 197 05 853 A1 | 8/1998 |
| DE | 10014124 C1 * | 3/2000 |
| FR | 332 947 | 3/1926 |
| FR | 1.012.351 | 4/1952 |

* cited by examiner

*Primary Examiner*—Melvin Jones
(74) *Attorney, Agent, or Firm*—Bateman IP Law Group (57) ABSTRACT

The refrigerating unit can be operated by means of a thermal solar system as energy source. Therein it is provided that the refrigerating unit is formed as a diffusion-absorption refrigerating unit. The refrigerating unit has an expeller, a triple heat exchanger, a condenser, an evaporator, a gas heat exchanger, an absorber, and a fuel reservoir which are actively connected to form a closed fuel circuit with one another.

19 Claims, 5 Drawing Sheets

REFRIGERATION UNIT

RELATED APPLICATIONS

The present application is the U.S. National Phase of PCT Application PCT/EP01/06412, filed Jun. 6, 2001, which claims priority to German Patent Application No. 10028543.0, filed Jun. 8, 2000.

BACKGROUND

The invention relates to a refrigerating unit, which can be operated by means of a thermal solar system as energy source, according to the preamble of claim 1.

Refrigerating units of the type addressed here, such as, for example, absorption refrigerating units or compression refrigerating units, are known. For solar operation, these absorption refrigerating units disadvantageously require a high outlay with regard to control technology and investment, in particular with regard to a continuous reheating or heat storage. In view of this, absorption refrigerating units are limited to a relatively narrow temperature and flow range. Also the known, photovoltaically operated compression refrigerating units are characterized by a high outlay with regard to investment and have relatively low efficiency. These known refrigerating units are not suited to problem-free and economical operation with thermal solar systems, in particular in the average capacity range.

SUMMARY OF THE INVENTION

It is the objective of the invention to provide a refrigerating unit of the type stated initially which can be operated in a reliable, effective, and operation-friendly manner by means of a thermal solar system, in particular in the lower to average refrigerating capacity range.

For the realization of this objective, a refrigerating unit with the features of claim 1 is proposed which is distinguished by the fact that the refrigerating unit is formed as a diffusion-absorption refrigerating unit. A diffusion-absorption refrigerating unit can be operated in a particularly reliable and efficient manner by means of a thermal solar system as an energy source. This behavior, which is favorable to operation, can also be achieved in a smaller to average refrigerating capacity range. A diffusion-absorption refrigerating unit is advantageously suitable to be operated by means of various energy sources. Among these, a thermal solar system as well as another heat transfer medium circuit, e.g. from a heat recovery process, can be used for the alternative or enhancing energizing of the refrigerating unit. A diffusion-absorption refrigerating unit is thus advantageously suitable, in a manner which is flexible and favorable for operation, to be energized with thermal energy by means of a thermal solar system as well as, if needed or desired, additional, different energy sources.

The refrigerating unit advantageously has an expeller, a triple heat exchanger, a condenser, an evaporator, a gas heat exchanger, an absorber, and a fuel reservoir, which are actively connected to one another to form a closed fuel circuit.

The refrigerating unit characterized by a closed fuel circuit can be formed as a hermetically closed, compact unit which is distinguished by an advantageous independence of site. It is operated merely by means of thermal energy and thus advantageously needs no electrical power supply. Since no components working mechanically within the refrigerating unit, such as, for example, pumps, are required to operate the refrigerating unit, the unit is maintenance-friendly, relatively favorable from the standpoint of cost, and can be operated, at least nearly, without noise. Furthermore, it is possible to develop the refrigerating unit so that the mounting of several refrigerating units in parallel can be realized in a relatively simple manner.

Preferably, the thermal solar system can be actively connected to an expeller formed as a gas bubble pump for the desorption and vaporization of a fuel contained in a solution. A gas bubble pump is particularly suitable for desorbing and vaporizing, in a manner which is effective and favorable for operation, a fuel contained in a solution such as, for example, ammonia (NH3) in an ammonia-rich solution. Furthermore, a gas bubble pump permits an efficient heat transfer accomplished by means of a thermal energy source, which is a prerequisite for reliable and effective desorption and vaporization of the fuel (ammonia).

According to a preferred form of embodiment, the expeller has at least one rising tube which on the inlet side is provided with a ribbing promoting the vaporization of the fuel contained in the rising tube. The rising tube of the expeller formed as a gas bubble pump contains a solution which is high in fuel and which, due to the vaporization of the fuel in the rising tube, experiences an increase in volume so that it assumes an operating volume which is a multiple of the original volume value, i.e. of the still not vaporized fuel. Due to this increase in volume, the level of the vaporous fuel, or of the fuel mixture in the rising tube, rises to a corresponding operational conveyance height. If this operational conveyance height exceeds the length of the rising tube due to a corresponding increase in volume of the fuel mixture or a vaporization of the fuel, the conveyance of the vaporous fuel, or a remaining solution which is low in fuel, to additional functional units of the refrigerating unit is started, said functional units being actively connected to one another in the form of a closed fuel circuit so that the refrigerating unit is activated at this moment in its operation. In so doing, an effective heat transfer from a thermal energy source (solar system) into the expeller or into the rising tube serves for a reliable and rapid activation of the refrigerating unit. This is guaranteed by means of a suitable ribbing of the rising tube whereby an enlargement of the heat transfer surface to improve the heat transfer into the rising tube is obtained. Instead of ribbing, deflecting plates can also be provided.

Advantageously, the expeller has a plurality of parallel rising tubes spaced at a distance from one another for the conveyance of a solution which is high in fuel, where a parallel recycling line for the conveyance of the solution which is low in fuel is disposed between at least two rising tubes. This makes possible an expeller formation which is compact and has the form of a bundle of tubes, where advantageously the rising tubes disposed externally can be energized with thermal energy, in a manner favorable to efficiency and operation, by means of a thermal energy source (solar system) while the interposed, parallel recycling line, through which a heated solution which is low in fuel is conveyed, makes possible an additional heating of the outer rising tubes, or counteracts a cooling of the same. The amount of heat radiating, and thus not actively utilized, is reduced in an effective manner due to a compact arrangement of the outer rising tubes as a bundle of tubes and a centrally disposed recycling line.

Preferably, the expeller is actively connected, on the inlet side with respect to the rising tube, to a supply line coming from the triple heat exchanger for the conveyance of the solution which is high in fuel, on the outlet side with respect to the rising tube, to a fuel vapor supply line leading to the triple heat exchanger, and, on the outlet side with respect to the recycling line, to a supply line leading to the triple heat exchanger for the conveyance of the solution which is low in fuel. The expeller preferably having a compact bundle of tubes is thus actively connected, on the inlet side as well as on the outlet side, to the triple heat exchanger which in turn is actively connected to additional functional units of the refrigerating unit to form a closed fuel circuit. In so doing, a solution which is high in fuel, a solution which is low in fuel, and fuel vapor are conveyed in the expeller after activation of the refrigerating unit.

Advantageously, the fuel vapor supply line leads essentially coaxially through the recycling line. An expeller of this type is formed particularly compactly and is distinguished by a particularly effective and reliable desorption and vaporization of a fuel in a solution which is high in fuel, said solution being contained in the respective rising tube, since an undesirable radiation of heat from the expeller into the environment can be reduced to a significant extent due to its compact arrangement as a bundle of tubes.

Advantageously, the rising tube has an inner structure promoting the formation of bubbles. An inner structure of this type in the rising tube can, for example, be achieved by means of a coating and/or a roughening of the inner surface and serves for the desired bubble formation in a solution which is high in fuel in a definite area in the rising tube due desired turbulence of the same solution, said turbulence being caused by the inner structure. The expeller formed as a gas bubble pump is suitable, with the use of rising tubes of this type, for a particularly effective desorption, vaporization, and conveyance of fuel contained in a solution which is high in fuel and for the conveyance of a solution which is low in fuel.

Advantageously, the fuel is ammonia (NH3) and the solution a mixture of ammonia and water (NH3/$H_2O$). NH3 as fuel and a mixture of NH3 and $H_2O$ as solution are particularly suited to an effective operation of the refrigerating unit according to the invention. Along with this, an auxiliary gas, used, if needed or desired, for the operation of the refrigerating unit, can be helium (He).

According to a preferred form of embodiment, the thermal solar system is actively connected over the entire longitudinal extension of the rising tube of the expeller to the same. By means of heating of the rising tube over its entire longitudinal extension, it is avoided in a reliable manner that, due to an undesired cooling in an unheated area of the rising tube, vaporous NH3, already expelled, condenses and thus cancels an intended increase in volume of the fuel contained in the rising tube, where the increase in volume would lead to the starting of the conveyance of the fuel, or the solution which is low in fuel. In this, the rising tubes are preferably each provided on the inlet side with a ribbing for the heating of the triple heat exchanger, of a fuel reservoir, and of a supply line leading to the condenser (vapor line).

Additional advantageous developments of the invention follow from the description.

BRIEF DESCRIPTION OF THE DRAWINGS

The invention is explained below in several embodiment examples with the aid of the accompanying drawings. Shown are.

DETAILED DESCRIPTION

Figure 1:
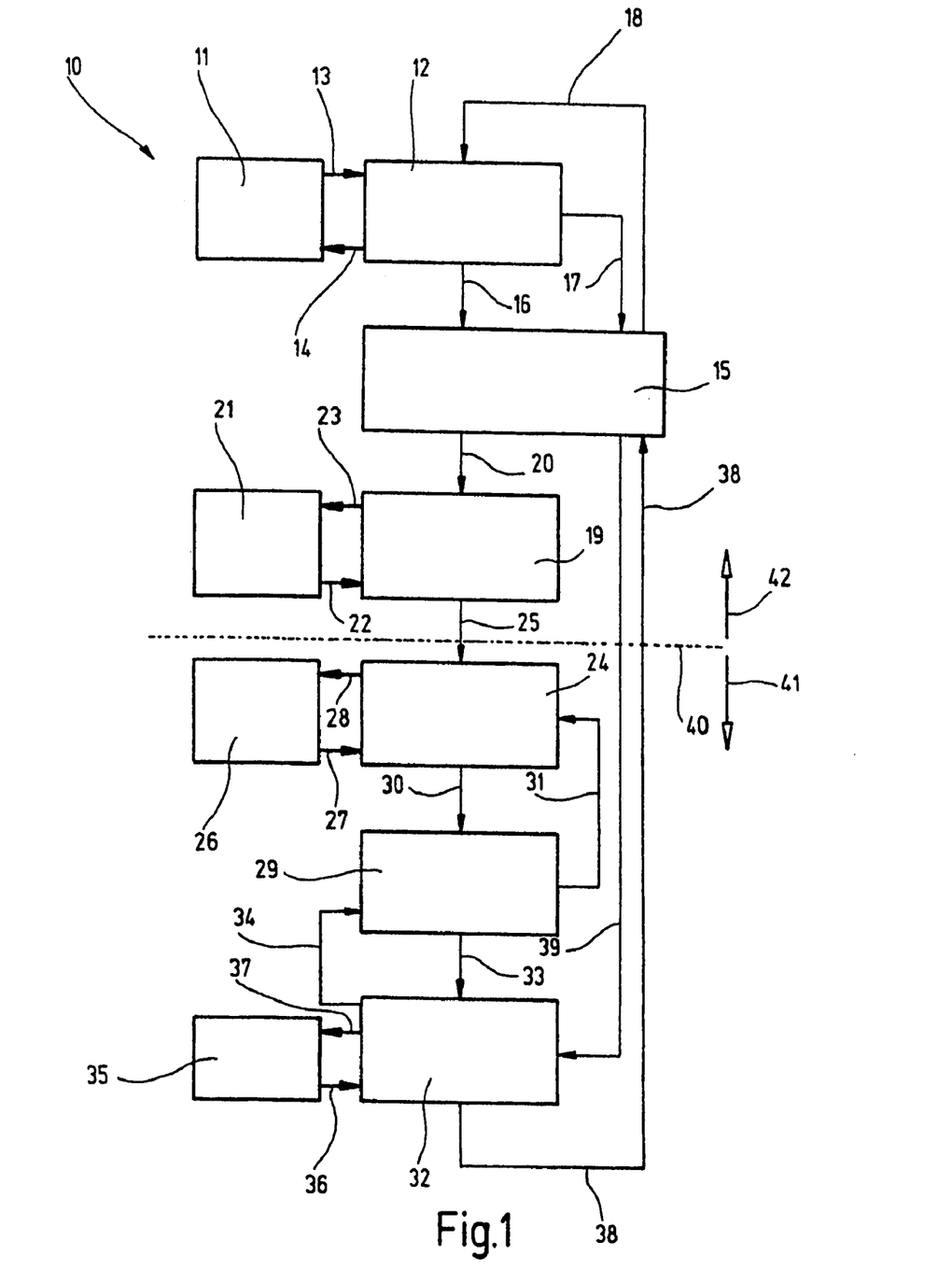
FIG. 1 shows a block diagram of a refrigerating unit according to the invention.
Figure 2A:
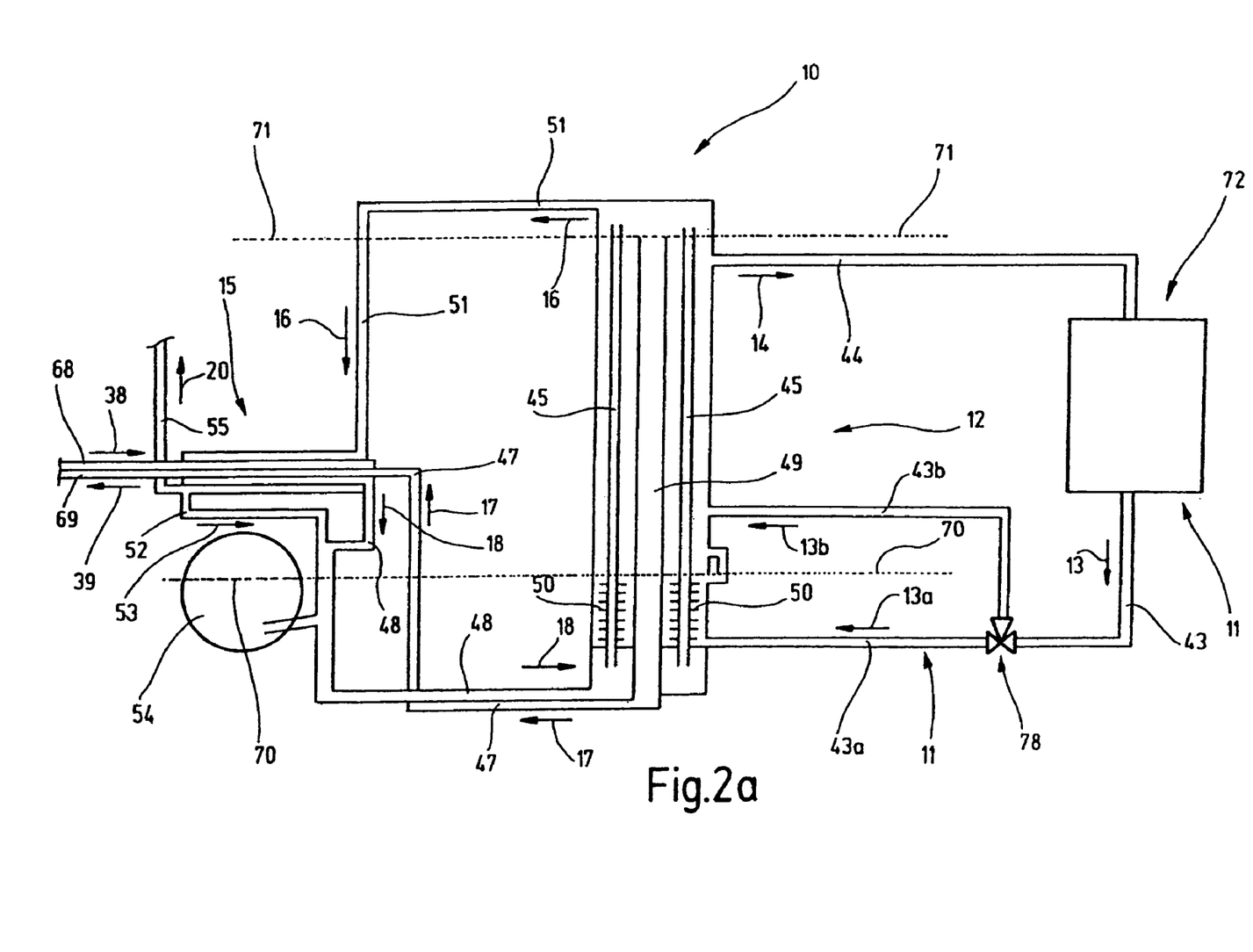
FIG. 2a shows a schematic representation of a first part of the refrigerating unit according to FIG. 1.
Figure 2B:
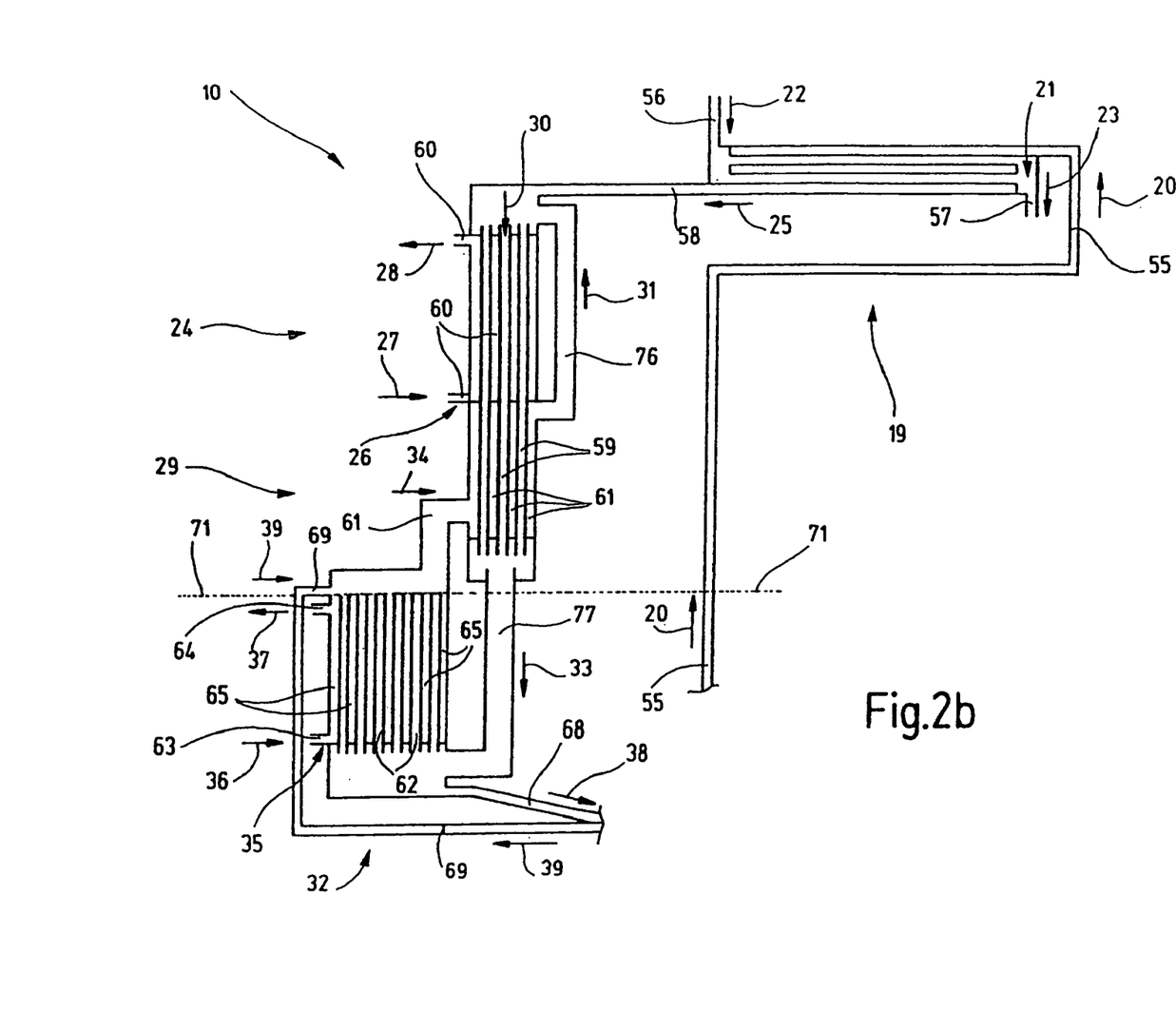
FIG. 2b shows a schematic representation of a second part of the refrigerating unit according to FIG. 1.

FIG. 1 shows a block diagram of a refrigerating unit 10. Furthermore, FIGS. 2a and 2b, which complement one another as partial figures, show the refrigerating unit 10 according to FIG. 1 in schematic representation. The refrigerating unit 10 has an expeller 12 which is actively connected to a thermal solar system 11 by means of heat transfer medium lines represented as arrows 13 and 14 (FIG. 2a: 43, 43a, 43b, 44). A fuel vapor supply line represented as an arrow 16 (FIG. 2a: 51) and a supply line, represented as an arrow 17 (FIG. 2a: 47) and serving to convey a solution which is low in fuel, leads from the expeller 12 to a triple heat exchanger 15, from which a supply line, represented as an arrow 18 (FIG. 2a: 48) and serving to convey a solution which is high in fuel, leads to the expeller 12. The triple heat exchanger 15 is actively connected to a condenser 19 by means of a supply line, represented as an arrow 20 (FIGS. 2a/2b: 55), for fuel vapor and, if needed or desired, with low percentages of water ($H_2O$). The condenser 19 is actively connected to a refrigerating medium circuit 21 by means of cold transfer medium lines, represented as arrows 22, 23 (FIG. 2b: 56, 57). A supply line, represented as an arrow 25 (FIG. 2b: 58) for liquid fuel leads from the condenser 19 to an evaporator 24 which is actively connected to a refrigerating medium circuit 26 by means of cold transfer medium lines, represented as arrows 27, 28 (FIG. 2b: 60). A supply line, represented as an arrow 30 (FIG. 2b: 59) for a gaseous mixture of vaporized fuel and an auxiliary gas leads from the evaporator 24 to a gas heat exchanger 29 which, in operation, is actively connected to the evaporator 24 by means of a supply line, represented as an arrow 31 (FIG. 2b: 76), for the precooled auxiliary gas. By means of a supply line, for the heated gas mixture consisting of fuel and auxiliary gas and represented as an arrow 33 (FIG. 2b: 77), the gas heat exchanger 29 is actively connected to an absorber 32, from which a supply line, for warm auxiliary gas and represented as an arrow 34 (FIG. 2b: 61), leads to the gas heat exchanger 29. The absorber 32 is actively connected to a refrigerating medium circuit 35 by means of cold transfer medium lines represented as arrows 36, 37 (FIG. 2b: 63, 64). A supply line, for a solution which is high in fuel and represented as an arrow 38 (FIGS. 2a/2b: 68), leads from the absorber 32 to a triple gas heat exchanger 15 and from the latter a supply line, for a solution which is low in fuel and represented as an arrow 39 (FIGS. 2a/2b: 69), leads to the absorber 32. The refrigerating unit 10 is divided, by means of a dotted line 40 according to arrow 42, into an upper area in which the total operational pressure is equal to the fuel pressure and, according to arrow 41, into a lower area in which the total operational pressure is equal to the sum of the fuel pressure and the auxiliary gas pressure. Preferably the fuel is ammonia (NH3), the auxiliary gas is helium (He), and each of the solution which is high in fuel and the solution which is low in fuel is a mixture of ammonia and water (NH3/$H_2O$).

NH3 vapor with low percentages of $H_2O$ is thus conveyed from the expeller 12 to the triple heat exchanger 15 (arrow 16), from which NH3 vapor flows into the condenser 19 (arrow 20) and is cooled to liquid NH3 where the liquid NH3 subsequently flows into the evaporator 24 (arrow 25) in which NH3 diffuses into a precooled He atmosphere forming a "heavy" cold He—NH3 gas mixture. This cold gas mixture flows into the gas heat exchanger 29 (arrow 30) in which the same is heated due to a heat transfer from a warm He stream (arrow 34) flowing in the opposite direction through the gas heat exchanger 29 and subsequently flows from the absorber 32 to the absorber 32 (arrow 33). The solution which is high in NH3/H$_2$O flows on the contrary from the absorber 32 to the triple heat exchanger 15 (arrow 38) and from there to the expeller 12 (arrow 18). The solution which is low in NH3/H$_2$O flows on the contrary to the triple heat exchanger 15 (arrow 17) and from there to the absorber 32 (arrow 39). Furthermore, the withdrawal of cooling capacity of the refrigerating unit 10 is done by means of the refrigerating medium circuit 26, which is actively connected to the evaporator 24.

FIG. 2a shows in addition the expeller 12 preferably formed as a gas bubble pump, said expeller being actively connected to the thermal solar system 11 and to the triple heat exchanger 15. The thermal solar system 11 has a solar cell unit 72 in the form of a solar collector cell unit which is actively connected, by means of the heat transfer medium lines 43, 43a, 43b, and 44, to a plurality of rising tubes 45 (in FIG. 2a two rising tubes 45 are represented) of the expeller 12. The heat transfer medium lines 43, 43a, and 43b are connected to one another in operation by means of a change-over valve 78 in such a manner that a heat transfer medium is conveyed according to arrow 13 from the solar cell unit through the heat transfer medium line 43 to the change-over valve 78, which conducts the heat transfer medium through the heat transfer medium line 43a and/or 43b according to arrow 13a or 13b to the expeller 12. The rising tubes 45 have on one side a ribbing 50 (or deflecting plate not represented) in order to insure a rapid, spatially defined, and reliable heat transfer from the heat carrier of the solar cell unit 11 to the solution which is high in fuel, said solution being located in the rising tubes 45.

Between the rising tubes 45 disposed in parallel at a distance from one another, a parallel recycling line 49 is disposed to convey a solution which is low in fuel. The expeller 12 is thus formed as a compact bundle of tubes (rising tubes 45 for solution which is high in fuel, recycling line 49 for solution which is low in fuel). The solution which is low in fuel is conducted, by means of a supply line 47, from the expeller 12 to the triple heat exchanger 15 and conducted from there to the absorber 32 by means of the supply line 69 (see also FIG. 2b). The fuel vapor is conducted, by means of a conducting line 51, from the expeller 12 to the triple heat exchanger 15 in which water is condensed out from the mixture of fuel and water vapor and conducted, by means of the line 52, according to the arrow 53 to the supply line 48 which serves to convey the solution which is high in fuel into the expeller 12. Pure, or nearly pure, fuel is conducted, by means of the supply line 55, from the triple heat exchanger 15 to the condenser 19 (see also FIG. 2b). The supply line 48 for conveying the solution which is high in fuel is actively connected to a fuel reservoir 54. A dotted line 70 denotes the level of liquid in the fuel reservoir 54 while a dotted line 71 represents the level of liquid in the inlet of the absorber 32 (see also FIG. 2b). The expeller 12 is formed as a compact bundle of tubes with a plurality of cold transfer medium lines 65 and a plurality of auxiliary gas conveyance lines 62. Likewise, the gas heat exchanger 29, the evaporator 24, and the condenser 19 are each formed as a compact bundle of tubes. The absorber 32 can however also be formed in such a manner that the cold transfer medium lines 65 are provided with intermediate spaces for the auxiliary gas conveyance lines 62 and preferably with deflecting plates.

To expel the fuel from the solution which is high in fuel as well as to convey the same, the expeller 12 needs a certain minimum supply of energy from the solar cell unit 72. A supply of energy into the expeller 12 below this limit would lead, when conveying the heat transfer medium into the expeller 12 through the heat transfer medium line 43a below the liquid level denoted as the dotted line 70, to undesirable reduction of the solution which is high in fuel without the same being conveyed. With longer operation of the refrigerating unit in a state of this type, the solution which is high in fuel, said solution being located in the expeller 12, would be reduced still further in fuel so that higher and higher operating temperatures would be required in order to expel additional fuel from the solution which is high in fuel. This has as a consequence that the refrigerating unit could no longer be put in operation without additional effort.

Providing a second heat transfer medium line 43b, which is actively connected to the expeller 12 above the liquid level denoted as the dotted line 70, advantageously makes it possible that, on starting the refrigerating unit, that energy which is not sufficient to expel the fuel from the solution which is high in fuel can still be used to preheat the expeller 12. Thereby it is avoided that a "high-value" energy has to be used to heat the expeller 12 (material of the tubes) so that this energy can be used exclusively for the conveyance of the solution which is high in fuel, said solution being located in the expeller 12, and to expel the fuel from the same. Furthermore, the solution which is high in fuel can be preheated in the triple heat exchanger 15, the fuel reservoir 54, and in the supply line 55 (vapor line) which leads to the condenser 19 by means of "low-value" solar energy.

Figure 3:
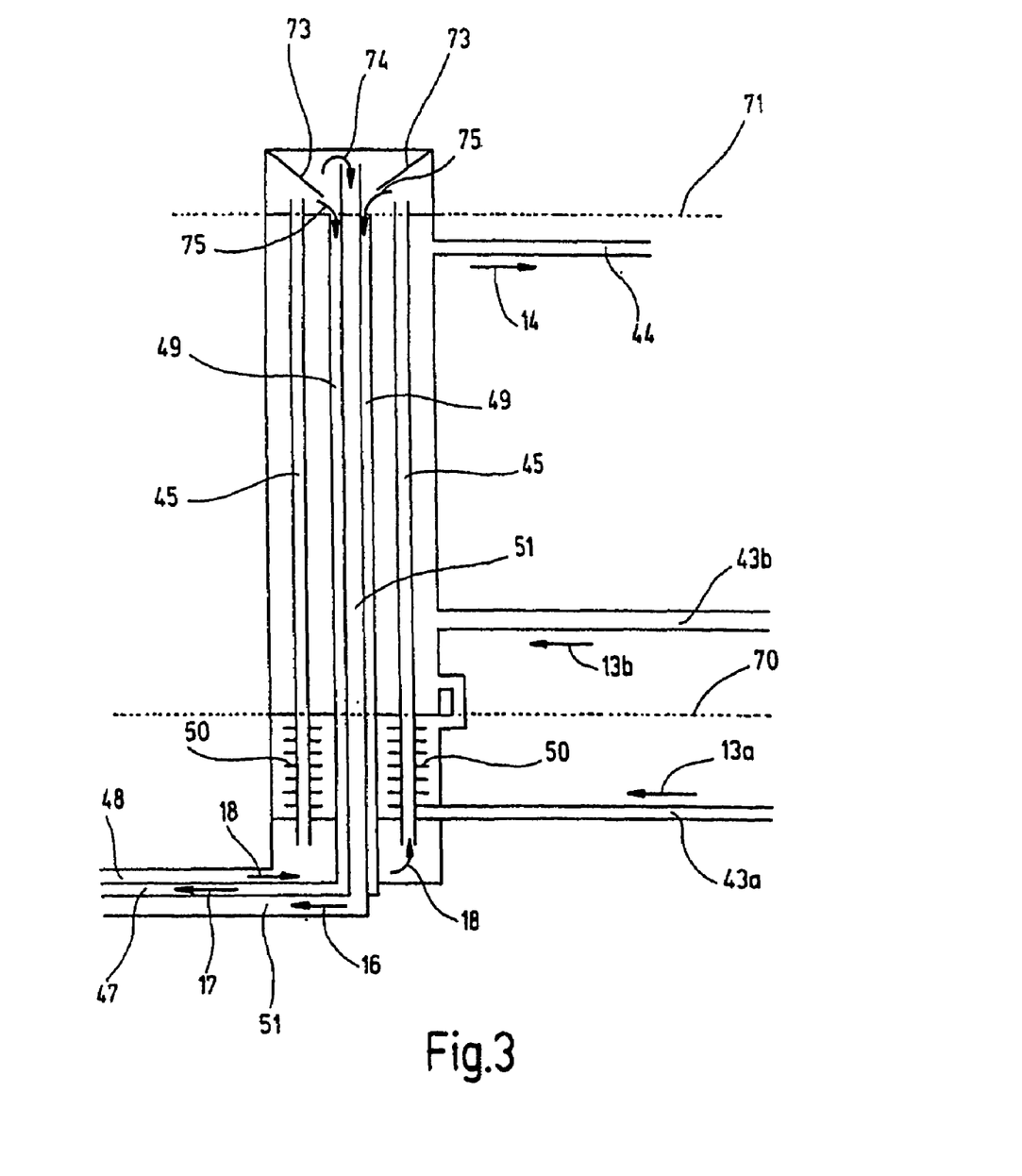
FIG. 3 shows an alternative form of embodiment of an expeller for the refrigerating unit according to FIG. 2.

FIG. 3 shows an expeller 12 according to an alternative development. This expeller 12 corresponds essentially to that of FIG. 2 and is different in that according to FIG. 3 the fuel vapor supply line 51 leads coaxially through the recycling line 49. In order to guarantee reliable separation in the expeller 12 of the fuel vapor (supply line 51) and the solution which is low in fuel (recycling line 49), an encircling, conically tapering baffle plate 73 is provided, disposed on the outlet side with respect to the rising tubes 45. The baffle plate 73 serves to conduct the solution which is high in fuel according to the arrows 75 into the recycling line 49 while the fuel vapor is conducted through a gap formed between the baffle plate 73 and the supply line 51 according to the arrow 74 into the supply line 51. The expeller 12 according to FIG. 3 is thus formed as a compact bundle of tubes with a plurality of rising tubes 45, a central recycling line 49, and a supply line 51 guided coaxially through the recycling line 49. The additional active connections of the expeller 12, or of the corresponding supply lines, to the corresponding functional units of the refrigerating unit 10 correspond to the above-described form of embodiment according to FIGS. 1 and 2.

The individual functional units of the refrigerating unit 10 are actively connected to one another and disposed spatially so as to form three gravity-based gas or liquid circuits. In so doing, only the external circuits for cooling (cooling circuits 21, 26, and 35) and for the thermal solar system 11 are maintained by means of conventional pumps. Within the refrigerating unit, each of the solution circuit, refrigerating medium circuit, and auxiliary gas circuit is closed.

The solution circuit begins in the expeller 12 formed as a gas bubble pump, where, by means of the solar system 11, thermal energy is supplied to convert a solution which is high in fuel into a mixture of vaporous fuel and water and into a solution which is low in fuel. The solution which is low in fuel is conveyed from the expeller 12 to the absorber 32 in which the solution which is low in fuel backs up in the supply line 69 up to a certain level of liquid. The solution which is low in fuel is thus raised from the level of liquid in the fuel reservoir 54 (dotted line 70) to the level of the inlet of the absorber 32 (dotted line 71). In the process, the conveyance height and the mass flow of the solution which is low in fuel depend on the geometric configuration of the expeller 12, the level of liquid in the fuel reservoir 54 (dotted line 70), and thus the immersion depth of the rising tubes 45, and the recycling line 49 of the expeller 12 as well as on the number of conveyance tubes (rising tubes 45, recycling line 49) of the expeller 12. The solution which is low in fuel conveyed to the absorber 32 absorbs the fuel supplied by the evaporator 24 to form a solution which is high in fuel, said solution being conducted for preheating through the triple heat exchanger 15 and flowing back into the expeller 12. The solution which is high in fuel flowing back into the expeller 12 is thus available once again to expel the fuel in the same.

In the refrigerating medium circuit, the mixture of hot fuel and water vapor, said mixture having been vaporized in the expeller 12, flows into the triple heat exchanger 15 and is precooled and rectified there by the cold solution which is high in fuel coming from the absorber 32 and flowing in the opposite direction. The pure fuel vapor, near to the condensation temperature, rises from the triple heat exchanger 15 into condenser 19 in which, through additional withdrawal of heat by means of the refrigerating medium circuit 21, the pure fuel is cooled to under its condensation temperature so that the fuel vapor condenses. The liquid fuel subsequently flows from the condenser 19 into the evaporator 24 in which the liquid fuel diffuses into an atmosphere of auxiliary gas and draws heat from the refrigerating medium of the refrigerating medium circuit 26. Subsequently the relatively heavy mixture of auxiliary gas and fuel sinks into the absorber 32.

In the auxiliary gas circuit, the atmosphere of auxiliary gas in the evaporator 24 is constantly pressurized with pure auxiliary gas in order to avoid the atmosphere of auxiliary gas reaching its saturation limit through the diffusing fuel and thus sufficient diffusion of liquid fuel into the atmosphere of auxiliary gas not taking place. The relatively heavy mixture of auxiliary gas and fuel sinks through the lines 59 from the evaporator 24 into the gas heat exchanger 29 and flows from it through the supply line 77 into the absorber 32. In the absorber 32 the fuel contained in the mixture is absorbed by the solution which is low in fuel, where the then lighter, pure auxiliary gas rises through the lines 62 from the absorber 32, flowing in the opposite direction, and with precooling by means of the refrigerating medium circuit 35 in the gas heat exchanger 29. From there, the pure auxiliary gas flows through the supply lines 61 and 76 into the upper area of the evaporator 24 in which it is enriched with diffusing fuel and subsequently sinks back into the absorber 32 once again as a mixture of fuel and auxiliary gas.

Advantageously, the triple heat exchanger 15 simultaneously fulfills three different functions, namely preheating of the solution which is high in fuel coming from the expeller 12, precooling of the low solution flowing to the absorber 32, and rectification of the NH$_3$-H$_2$O vapor coming from the expeller 12. By conducting the hot vapor mixture along the solution which is high in fuel cooled in the absorber 32, the water vapor contained condenses and falls back as condensate into the solution which is high in fuel. The heat of condensation or rectification being released is thus also used to preheat the rich solution. The triple heat exchanger 15 thus provides for a nearly complete recovery of the heat of rectification which advantageously no longer has to be supplied to the expeller 12 from outside.

Figure 4:
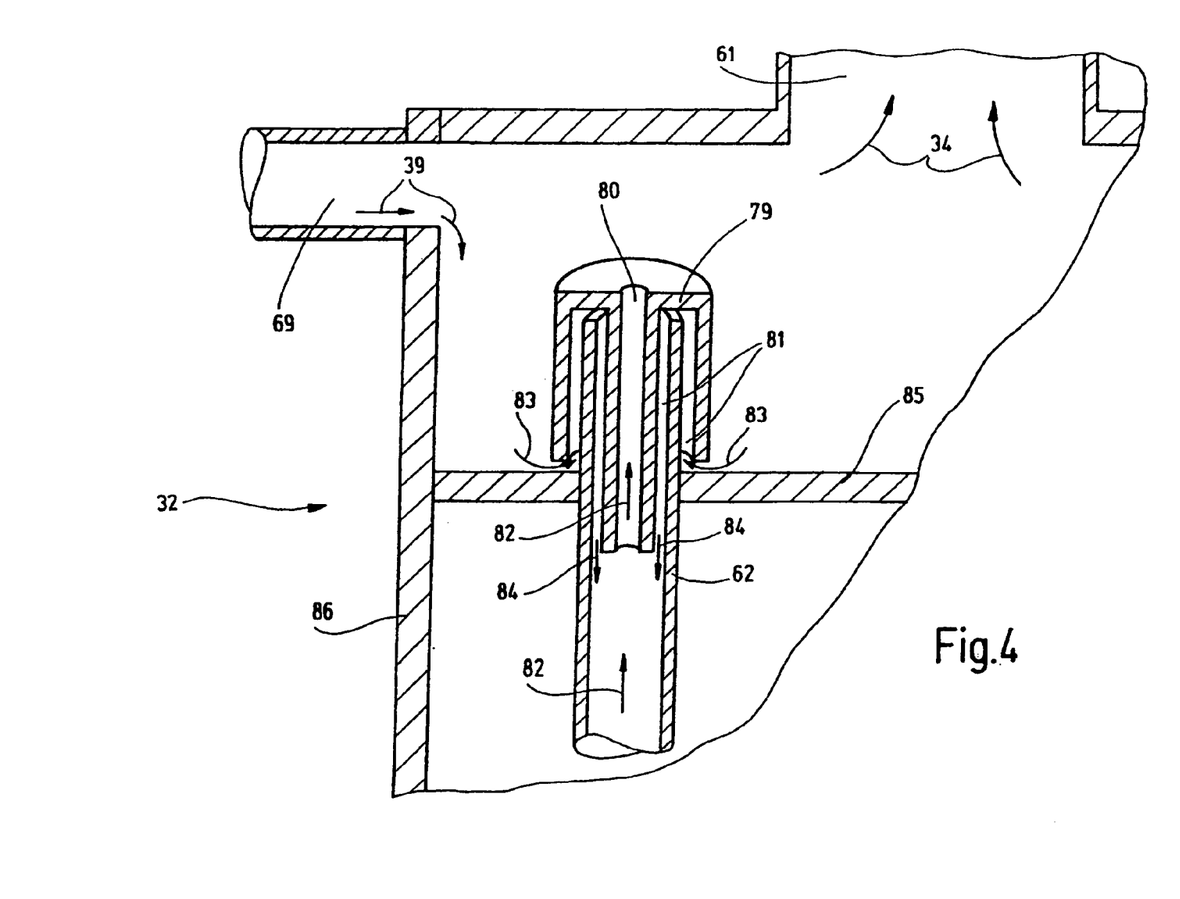
FIG. 4 shows a schematic representation of a conveyance line having a capillary sleeve on an enlarged scale.

FIG. 4 shows a detail of the absorber 32 on an enlarged scale. According to this preferred form of embodiment, the given auxiliary gas conveyance line 62 of the absorber 32 is provided with a capillary sleeve 79 which is actively connected to the line 62, on the outlet side with respect to the auxiliary gas conveyance line (arrow 82). The capillary sleeve 79 forms, together with the line 62, a capillary gap 81, extending circumferentially, through which the solution which is low in fuel (liquid) can flow according to the arrows 83 and 84. The solution which is low in fuel is thus conducted by means of the supply line 69 into the absorber 32 and, due to the capillary action present, conveyed according to the arrows 83 and 84 into the given auxiliary gas conveyance line 62 of the absorber 32 in which the same slides downwards along its walls (arrow 84). The auxiliary gas is conducted according to the arrows 82 through the auxiliary gas conveyance line 62 and through a central longitudinal hole 80 of the capillary sleeve 79 and flows according to the arrows 34 to the supply line 61 which actively connects the absorber 32 to the gas heat exchanger 29. A separating plate 85 connected to a jacket tube 86 of the absorber 32 makes it possible that the solution which is low in fuel, said solution being located in the absorber 32, can be backed up to a certain level of liquid (FIG. 2b: dotted line 71). A given auxiliary gas conveyance line 62 equipped with a capillary sleeve 79 is advantageous since, due to the capillary action present at the time in the corresponding capillary gap 81, a uniform distribution of the solution which is low in fuel to the individual auxiliary gas conveyance line 62 in the absorber 32 is guaranteed independently of the level, present at the time, of the solution which is low in fuel in the absorber 32 or on the amount of the solution which is low in fuel flowing through the supply line 69 into the absorber 32 according to the arrows 39. In particular in the case of an oblique position (not represented) of the absorber 32, it is avoided by means of the capillary sleeves 79, due to capillary action setting in, that several auxiliary gas conveyance lines 62 are completely filled with solution which is low in fuel and the remaining auxiliary gas conveyance lines 62 are not pressurized with solution which is low in fuel so that the absorber 32 would not be functional, at least not completely.

According to a preferred form of embodiment not represented, each of the auxiliary gas conveyance line 62 can be provided with a plurality of projections acting as space holders at its free end projecting into the interior of the auxiliary gas conveyance line 62, by means of which projections a coaxial, with respect to the corresponding auxiliary gas conveyance lines 62, positioning of the respective capillary sleeve 79 is possible in a relatively simple manner. Projections of this type at the free end of the respective capillary sleeve 79 are preferably distributed uniformly over its circumference and spaced sufficiently far from one another that a free flow of the solution which is low in fuel through the capillary gap according to arrows 83 and 84 is guaranteed.

Corresponding to another additional form of embodiment not represented, the lines 59 of the evaporator 24 are provided at their upper free end with a corresponding capillary sleeve 79 according to FIG. 4.

What is claimed is:
1. A refrigerating unit, which is formed as a diffusion-absorption refrigerating unit, comprising: a closed fuel cir- cuit having a triple heat exchanger for preheating a solution which is high in fuel and precooling a solution which is low in fuel, and for rectification of a mixture of fuel and water vapor, and a thermal solar system as an energy source wherein the thermal solar system is actively connected to an expeller formed as a gas bubble pump for the desorption and vaporization of a fuel contained in a solution.

2. The refrigerating unit according to claim 1, wherein the expeller has at least one rising tube which on the inlet side is provided with a ribbing promoting the vaporization of the fuel contained in the rising tube.

3. The refrigerating unit according to claim 1, wherein the expeller has a plurality of parallel rising tubes spaced at a distance from one another for the conveyance of a solution which is high in fuel, where a parallel recycling line for the conveyance of the solution which is low in fuel is disposed between at least two rising tubes.

4. The refrigerating unit according to claim 1, further comprising a rising tube and wherein the expeller is actively connected, on an inlet side with respect to the rising tube, to a supply line, coming from the triple heat exchanger, for the conveyance of the solution which is high in fuel, on the outlet side with respect to the rising tube, to a fuel vapor supply line leading to the triple heat exchanger, and, on the outlet side with respect to the recycling line, to a supply line, leading to the triple heat exchanger, for the conveyance of the solution which is low in fuel.

5. The refrigerating unit according to claim 4, wherein the fuel vapor supply line leads essentially coaxially through the recycling line.

6. The refrigerating unit according to claim 1, further comprising a rising tube having an inner structure promoting the formation of bubbles.

7. The refrigerating unit according to claim 1, wherein the fuel is ammonia (NH3) and the solution a mixture of ammonia and water (NH3/H2O).

8. The refrigerating unit according to claim 1, wherein the thermal solar system is actively connected over an entire longitudinal extension of the rising tube of the expeller.

9. The refrigerating unit according to claim 1, further comprising at least one of an absorber and an evaportator having conveyance lines, wherein the conveyance lines have upper free ends with a corresponding capillary sleeve.

10. The refrigeration unit of claim 1, where the closed fuel circuit comprises an expeller condenser, an evaporator, a gas heat exchanger, an absorber, and a fuel reservoir which are actively connected to one another to form a closed fuel circuit.

11. The refrigerating unit according to claim 10, wherein the expeller has at least one rising tube which on the inlet side is provided with a ribbing promoting the vaporization of the fuel contained in the rising tube.

12. The refrigerating unit according to claim 10, further comprising a rising tube and wherein the expeller is actively connected, on an inlet side with respect to the rising tube, to a supply line, coming from the triple heat exchanger, for the conveyance of the solution which is high in fuel, on the outlet side with respect to the rising tube, to a fuel vapor supply line leading to the triple heat exchanger, and, on the outlet side with respect to the recycling line, to a supply line, leading to the triple heat exchanger, for the conveyance of the solution which is low in fuel.

13. The refrigerating unit according to claim 12, wherein the fuel vapor supply line leads essentially coaxially through the recycling line.

14. The refrigerating unit according to claim 10, further comprising a rising tube having an inner structure promoting the formation of bubbles.

15. The refrigerating unit according to claim 10, wherein the fuel is ammonia (NH3) and the solution a mixture of ammonia and water (NH3/H2O).

16. The refrigerating unit according to claim 10, wherein the thermal solar system is actively connected over an entire longitudinal extension of the rising tube of the expeller.

17. The refrigerating unit according to claim 10, further comprising at least one of an absorber and an evaportator having conveyance lines, wherein the conveyance lines have upper free ends with a corresponding capillary sleeve.

18. A refrigerating unit, which is formed as a diffusion-absorption refrigerating unit and can be operated by means of a thermal solar system as energy source, with an expeller, a triple heat exchanger, a condenser, an evaporator, a gas heat exchanger, an absorber, and a fuel reservoir which are actively connected to one another to form a closed fuel circuit, wherein the refrigerating unit has, in the fuel circuit, a triple heat exchanger for preheating a solution which is high in fuel and precooling a solution which is low in fuel, and for the rectification of a mixture of fuel and water vapor.

19. A method for refrigerating a unit, the method comprising:
   forming a fuel circuit having a triple head exchanger; and
   preheating a solution which is high in fuel, precooling a solution which is low in fuel, and
   rectifying a mixture of fuel and water vapor; and
   using a thermal solar system as an energy source, wherein the thermal solar system is actively connected to an expeller formed as a gas bubble pump for the desorption and vaporization of a fuel contained in a solution.

* * * * *

UNITED STATES PATENT AND TRADEMARK OFFICE
CERTIFICATE OF CORRECTION

PATENT NO.        : 7,201,017 B2
APPLICATION NO.   : 10/297462
DATED             : April 10, 2007
INVENTOR(S)       : Ulrich Barth et al.

It is certified that error appears in the above-identified patent and that said Letters Patent is hereby corrected as shown below:

Column 2:
    Line 13, reads "...NH3..."; should read --...$NH_3$...--

Column 3:
    Lines 35, 36, 37, 48, read "...NH3..."; should read --...$NH_3$...--

Column 4:
    Lines 60, 62, 63, 65, 66 read "...NH3..."; should read --...$NH_3$...--

Column 5:
    Lines 1, 2, 8, 11, read "...NH3..."; should read --...$NH_3$...--
    Line 2, reads "...cold He--NH3 gas mixture..."; should read --...cold He-NH3 gas mixture...--

Column 7:
    Line 62, reads "...NH3..."; should read --...$NH_3$...--

Column 8:
    Line 48, reads "...gas conveyance line 62..."; should read --...gas conveyance lines 62...--

Column 9:
    Lines 35, 36, read "...NH3..."; should read --...$NH_3$...--
    Line 36, reads "...H2O..."; should read --...$H_2O$...--

UNITED STATES PATENT AND TRADEMARK OFFICE
CERTIFICATE OF CORRECTION

PATENT NO. : 7,201,017 B2
APPLICATION NO. : 10/297462
DATED : April 10, 2007
INVENTOR(S) : Ulrich Barth et al.

It is certified that error appears in the above-identified patent and that said Letters Patent is hereby corrected as shown below:

Column 10:
    Lines 20, 21, read "...NH3..."; should read --...$NH_3$...--
    Line 21, reads "...H2O..."; should read --...$H_2O$...--

Signed and Sealed this

Sixteenth Day of June, 2009

JOHN DOLL
*Acting Director of the United States Patent and Trademark Office*